(12) United States Patent
Elliott (10) Patent No.: US 11,081,877 B2
(45) Date of Patent: Aug. 3, 2021

(54) BACK-UP OVERLOAD PROTECTION SCHEME FOR SOLID STATE CONTROLLER

(71) Applicant: GE Aviation Systems Limited, Cheltenham (GB)

(72) Inventor: David Allen Elliott, Cheltenham (GB)

(*) Notice: Subject to any disclaimer, the term of this patent is extended or adjusted under 35 U.S.C. 154(b) by 423 days.

(21) Appl. No.: 15/916,939

(22) PCT Filed: Oct. 4, 2016

(86) PCT No.: PCT/EP2016/073632
§ 371 (c)(1),
(2) Date: Mar. 9, 2018

(87) PCT Pub. No.: WO2017/060217
PCT Pub. Date: Apr. 13, 2017

(65) Prior Publication Data
US 2018/0226789 A1 Aug. 9, 2018

(30) Foreign Application Priority Data
Oct. 7, 2015 (EP) .................................. 15188835

(51) Int. Cl.
*H02H 3/00* (2006.01)
*H02H 7/22* (2006.01)
(Continued)

(52) U.S. Cl.
CPC ............ *H02H 7/22* (2013.01); *H02H 1/0007* (2013.01); *H02H 1/0061* (2013.01);
(Continued)

(58) Field of Classification Search
CPC ...... H02H 7/22; H02H 1/0007; H02H 1/0061; H02H 1/0092; H02J 4/00; B64D 45/00; B64D 2221/00
(Continued)

(56) References Cited

U.S. PATENT DOCUMENTS 4,656,356 A  4/1987  Yoda et al.
4,656,365 A  4/1987  Billings
(Continued)

FOREIGN PATENT DOCUMENTS

DE  195 45 928 A1  6/1997
DE  10 2013 216 939 A1  3/2014
EP  1 276 201 A2  1/2003

OTHER PUBLICATIONS

Extended European Search Report and Opinion issued in connection with corresponding EP Application No. 15188835.1 dated Dec. 4, 2015.
(Continued)

*Primary Examiner* — Jared Fureman
*Assistant Examiner* — Lucy M Thomas
(74) *Attorney, Agent, or Firm* — Wood IP LLC (57) ABSTRACT

A power distribution system comprises a first power distribution unit coupled to an electrical power source and a second lower power distribution unit serially coupled to the first distribution unit and configured to supply to power to one or more loads. The first and second distribution units each comprise at least one solid state power controller configured to control current flow through the respective first and second distribution units. The first distribution unit further comprises control means configured to receive and analyze data related to measurements of downstream current and to interrupt the power within the first distribution unit when the received current measurements exceed a predetermined threshold. The system further includes a current monitoring component configured to measure the current flow to, or within, the second distribution unit, the current monitoring component configured to transmit current data to the control means within the first distribution unit for analysis.

19 Claims, 5 Drawing Sheets

(51) Int. Cl.
  *H02J 4/00* (2006.01)
  *H02H 3/08* (2006.01)
  *H02H 3/05* (2006.01)
  *H02H 1/00* (2006.01)
  *B64D 45/00* (2006.01)

(52) U.S. Cl.
  CPC ............ *H02H 1/0092* (2013.01); *H02H 3/05* (2013.01); *H02H 3/08* (2013.01); *H02J 4/00* (2013.01); *B64D 45/00* (2013.01); *B64D 2221/00* (2013.01)

(58) Field of Classification Search
  USPC .......................................................... 361/87
  See application file for complete search history.

(56) References Cited

U.S. PATENT DOCUMENTS

| | | | |
|---|---|---|---|
| 6,373,669 B1 * | 4/2002 | Hartmann | ................ H02H 7/30 |
| | | | 361/42 |
| 7,505,820 B2 | 3/2009 | Plivcic et al. | |
| 7,586,725 B2 | 9/2009 | DiVito et al. | |
| 7,936,084 B2 | 5/2011 | Serventi et al. | |
| 8,861,162 B2 * | 10/2014 | Fuller | .................... H01H 9/548 |
| | | | 361/42 |
| 2015/0162741 A1 | 6/2015 | Valdes | |

OTHER PUBLICATIONS

International Search Report and Written Opinion issued in connection with corresponding PCT Application No. PCT/EP2016/073632 dated Oct. 24, 2016.

* cited by examiner

BACK-UP OVERLOAD PROTECTION SCHEME FOR SOLID STATE CONTROLLER

BACKGROUND

The present invention relates to electrical power distribution systems, and in particular, to a back-up protection mechanism to prevent damage and associated dangers resulting from passing excessive current through an electric power distribution cable.

Figure 1:
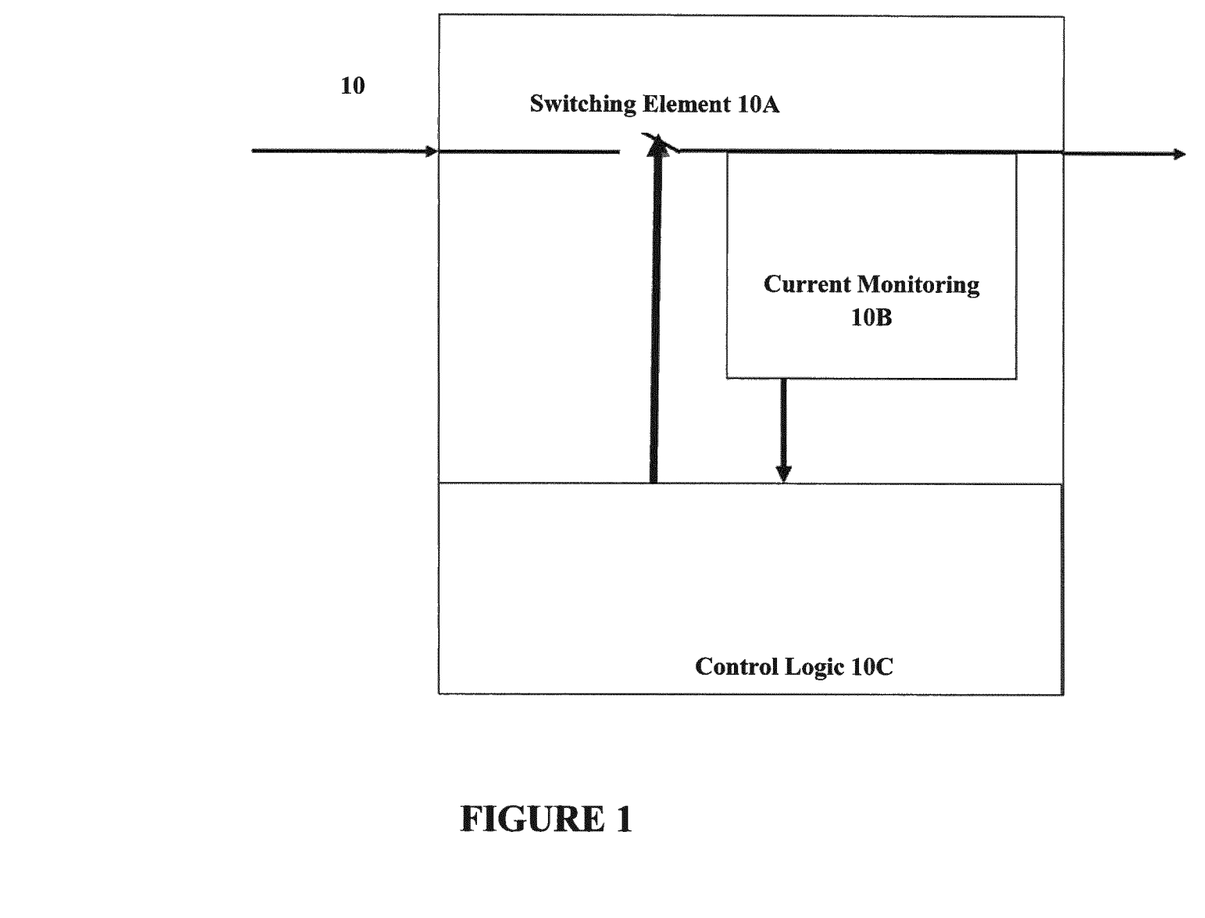
FIG. 1 is a block diagram illustrating the configuration of a typical Solid State Power Controller (SSPC)

In applications such as aircraft and other vehicle systems, that include integrated electrical power generating systems, primary distribution units are provided to handle the high power levels produced by generators, while secondary distribution units are provided to divide power from the primary units to supply lower power loads such as avionics, lighting etc. In new designs of these distribution units, Solid State Power Controllers (SSPCs) are progressively replacing traditional thermal/mechanical circuit breaker, relays and contactors. A typical SSPC 10 is illustrated in FIG. 1 and comprises a solid state switching element 10A which performs the fundamental power on/off switching, a current monitoring component 10B which measures current flowing through the SSPC 10, and SSPC control logic 10C which is responsible for on/off control of the switching element 10A and feeder wire protection. The SSPC senses the current passing through it and either, instantly trips in severe overloads, or tracks the current behaviour in minor overload conditions to determine if and when to trip. The solid state nature of these devices means there are no moving parts, so that the SSPC's lifetime is much longer than that of a conventional electromagnetic circuit breaker which improves reliability.

SSPCs provide additional advantages in that they have a much faster response time, offer size and weight savings over traditional circuit breakers and direct wiring, often provide operating real-time data including supply voltage and current demand for both avionic systems such as aircraft health monitoring and aircraft maintenance crew, and since they are not dependent on temperature changes, they can offer more predictable performance. Unlike centralized electric power distribution systems, distribution units that contain SSPCs can be located throughout the aircraft or other vehicle, and can be remotely controlled, allowing them to be strategically positioned so as to minimize wiring.

Figure 2:
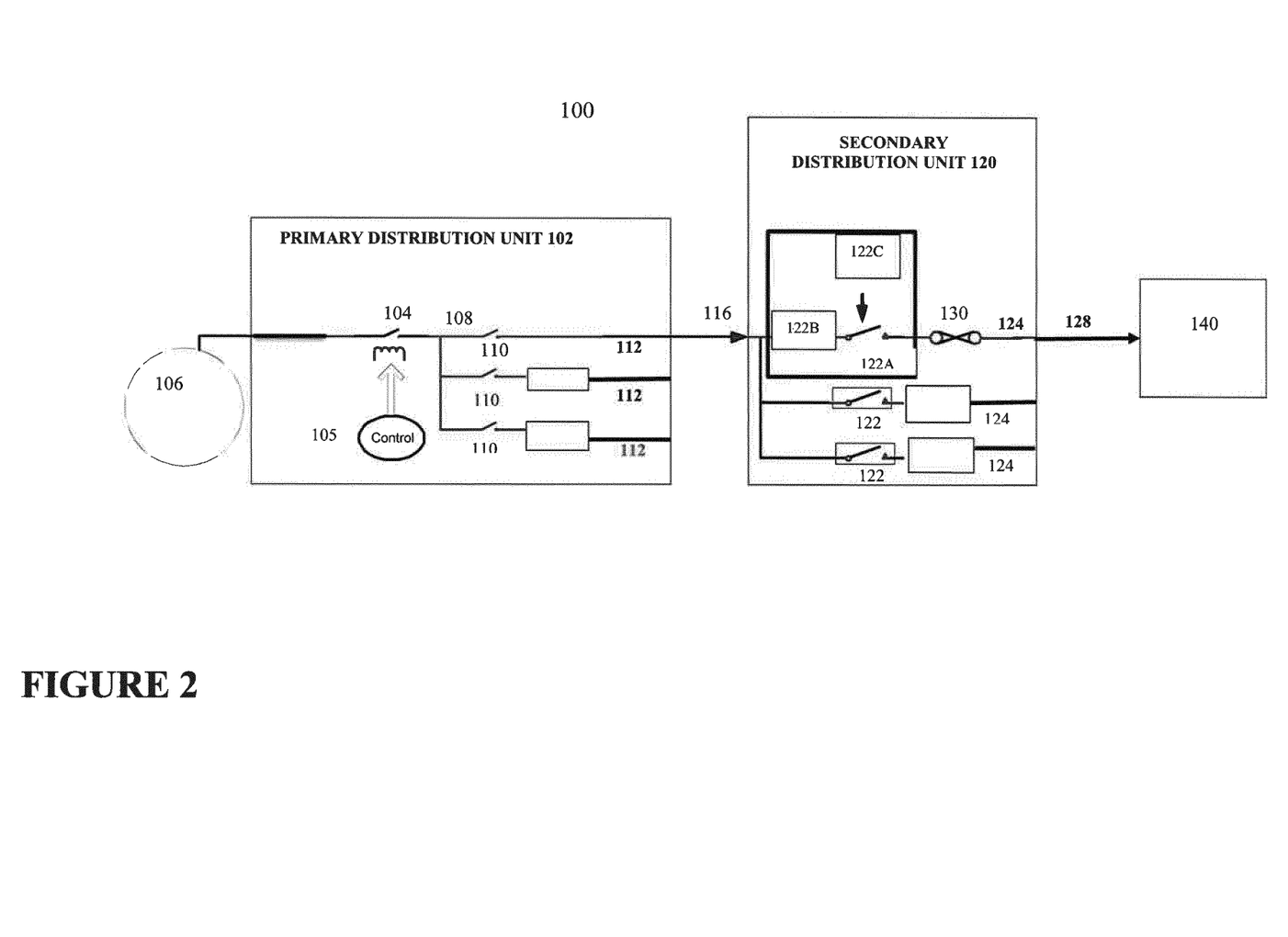
FIG. 2 is a block diagram representation of a typical power distribution system using SSPCs within the secondary distribution units.

A simplified representation of a typical power distribution system 100 using SSPCs within the secondary distribution is shown in FIG. 2. Electrical power distribution systems are usually custom designed for individual applications, but typically follow similar general principles as that illustrated in FIG. 2. Although only one primary and secondary distribution units are shown in FIG. 2, it should be understood that the system will typically comprise a plurality of primary and secondary units. The flow of power into the primary distribution unit 102 is controlled by a primary power source contactor 104 which connects electric power from a power source 106, such as a generator, to the internal bus 108 of the primary distribution unit 102. Power distribution to each of the secondary distribution units 120 is controlled by individual high current feeder circuit breakers 110 which are coupled to the primary distribution internal bus 108. It should be appreciated that each primary distribution unit 102 may comprise any number of such high current feeder circuit breakers 110, each for use with a separate primary distribution circuit 112 within the primary distribution unit 102.

In the secondary distribution unit 120, distribution of power from the primary distribution output 116 to a load 140 is controlled via a series of solid state power controllers (SSPC) 122 (referred to hereafter as secondary SSPCs 122). Although three such secondary SSPCs 122 are shown in FIG. 2, it should be understood that each secondary distribution unit 120 may include any number of similar SSPCs 122, each for use with a distinct secondary distribution circuit 124 within the secondary distribution unit 120. Each secondary SSPC 122 is completely independent, so that a fault associated with a particular secondary distribution circuit 124 can only compromise the protection mechanisms of a single secondary SSPC 122.

Although the configuration of only one secondary SSPC 122 is shown in detail in FIG. 2, each secondary SSPC 122 is as described with reference to FIG. 1, comprising a switching element 122A, a current monitoring component 122B and control logic 122C. The current monitoring component 122B typically measures the portion of current which is flowing through the secondary SSPC 122 from the input current received from the primary distribution unit 102. The control logic 122C is programmed to cause the switching element 122A to trip on detection of an overcurrent condition, before the output load wiring 128 is damaged by heat generated by the excessive current flow. A principal responsibility of each secondary SSPC 122 is to prevent fires and damage to other adjacent wiring resulting from a power wire (such as load wiring 128) overheating when a fault in the wiring 128 or load 140 causes an excessive current flow, by detecting the condition and opening the faulty circuit.

Although inherently more reliable that traditional thermal/mechanical circuit breakers, there still exists a remote possibility that a given secondary SSPC 122 could fail to break the circuit which may have catastrophic consequences in high risk applications, such as an aircraft. Therefore, in these circumstances, a backup fuse 130 or equivalent fusible element, is conventionally provided in series with the secondary SSPC 122 to provide a further level of protection for the load 140 and the secondary distribution wiring 128. As is well known, on failure of the secondary SSPC 122 to prevent a sustained overload, the fuse 130 will be heated by the current flowing through it, and will melt if an excessive current continues to flow for an extended period, breaking the circuit.

The protection device illustrated in the primary distribution unit 102 of FIG. 2 is a circuit breaker 110, which is representative of that used in many existing electrical power supply designs. Initially, SSPCs were limited to low current applications and hence were precluded from the higher current requirements typically found in primary distribution units. However, recent technology advancements have enabled direct replacement of these higher current circuit breakers in the primary distribution unit with SSPCs.

Figure 3:
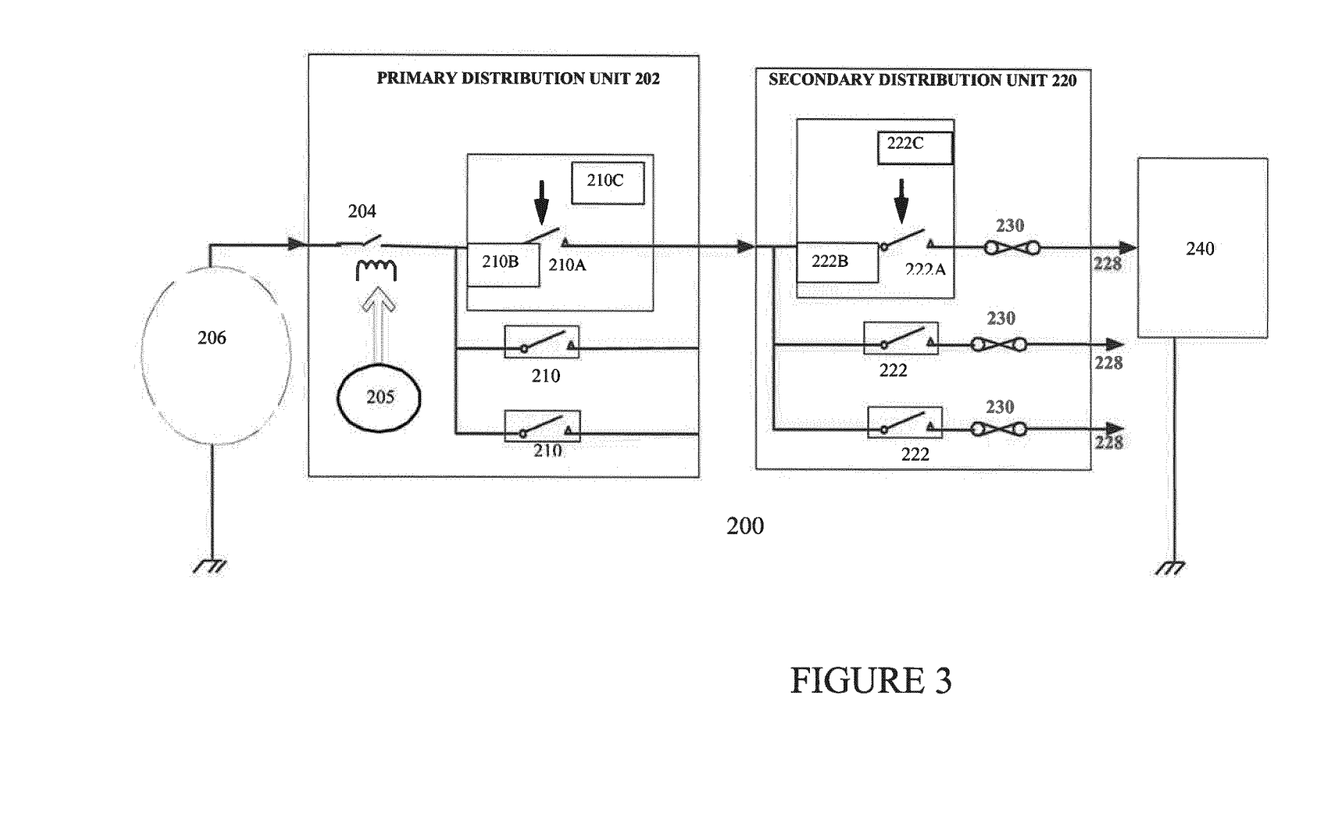
FIG. 3 is a block diagram representation of a typical power distribution system using SSPCs within both the primary and secondary distribution units.

A simplified representation of a typical power distribution system 200 using SSPCs in both the primary and secondary distribution units is shown in FIG. 3. The primary distribution unit 202 is largely identical to that illustrated in FIG. 2, except that each feeder circuit breaker 110 is now replaced by a SSPC 210 (referred to hereafter as a primary SSPC 210). As in FIG. 2, the configuration of only one of the primary SSPCs 210 is shown in detail in FIG. 3, but each primary SSPC 210 again includes a switching element 210A, a current monitoring component 210B and control logic 210C. The secondary distribution unit 220 is identical to that of FIG. 2, with a backup fuse 230 being provided downstream of each secondary SSPC 222 to maintain the same level of protection for the load 240 and the secondary distribution wiring 228. The use of the backup fuse 230 is necessary because due to the difference in power levels between the primary and secondary distribution units 202, 220, the current trip level of the primary SSPC 210 will usually be much greater than the current carrying capacity of the secondary distribution wiring 228. Therefore, in the event of failure of the secondary SSPC 222 of the secondary distribution unit 220, protection is still required.

In both the systems of FIGS. 2 and 3, selecting a fuse 130, 230 to fully coordinate with the secondary SSPC 122, 222 can be very problematic. This selection difficulty arises in a wide range of situations, but it is particularly acute for applications such as aircraft electrical power distribution, where the consequences of overheating are typically much more severe. Ideally, in normal operation, including permissible temporary overload conditions, the secondary SSPC 122, 222 will perform the protection function and the fuse 130, 230 will not be affected. However, it has been found that such temporary overload conditions often subject the fuse 130, 230 to stresses, such as temperature changes and short-term, high transient current flows, which cause premature failure thereof, resulting in unnecessary loss of power to the load. For this reason, a fuse 130, 230 with a higher current rating than required in ideal operation may be used so as to achieve an acceptable premature failure rate.

However, such use of a higher current rated fuse can potentially give rise to further problems. Ideally, in the event of failure of the secondary SSPC 122, 222 to break the circuit, the fuse 130, 230 would be expected to break the circuit when excessive current flows for an extended period of time, before the secondary distribution wiring 128, 228 and systems downstream of the secondary SSPC 122, 222 suffer overheating damage. However, if the current is excessive, but not extremely large, there is a risk that a higher rated fuse 130, 230 may stay intact for sufficiently long to allow damage to the downstream wiring 128, 228. If the wiring 128, 228 has been selected according to SSPC fault-free control ratings, the consequences of such overheating are potentially very serious and may lead to smoke and fire, or at the very least, the costly and time-consuming replacement of wiring. In many applications such as aircraft or other vehicles, this risk is unacceptable, and the wire gauge used would have to be increased, so as to comply with the higher fuse rating. Such an increase in the wire gauge negates the weight savings in wiring accrued by employing advanced SSPC technology. The effect of these shortcomings is magnified by the wide tolerance margins associated with fuses, due to a combination of factors, including manufacturing tolerances, thermal pathway from the fusible element to the environment, thermal and mechanical stress history and ambient temperature.

An alternative approach, which has been described in previous patents, is to employ a 'crowbar' circuit. This additional circuit must detect the secondary SSPC 122, 222 failing to trip when an extended overcurrent occurs. When the fault is detected, the output of the fuse 130, 230 is shorted to the power current return by an additional high current switching component (typically a triac, thyristor or power FET), causing a large current to flow through the fuse 130, 230 and blow it. Since the crowbar circuit ensures that a very large current will flow when connected to an appropriate supply, the fuse 130, 230 can be selected to be sufficiently robust to never blow in fault-free conditions. Whilst this approach affords a second level of protection, once it has fired it will be necessary to manually replace the fuse 130, 230 to restore the power. This implies the crowbar circuit must be extremely reliable, particularly if the load the SSPC is supplying is safety critical. In an aircraft situation, an unexpected transient, such as might be generated by high energy lightning strike(s), could be sufficient to trigger two or more such crowbar circuits within a single flight, which may result in the aircraft being disabled to the extent it could not be landed safely. Whilst an SSPC with a false trip may be remotely reset by the crew (unless prevented by deliberate software interlocks etc.), a blown fuse requires physical fuse replacement in a unit, which may be inaccessible to flight crew and which may involve electrical shock hazard.

Hence, there is a need for a reliable back-up protection mechanism for distributed power units using SSPC technology that avoids the use of fusible elements.

It is an object of the present invention to provide an independent, back-up protection mechanism to interrupt excessive current flow when a SSPC trip mechanism has failed, without using a fusible element approach.

BRIEF DESCRIPTION

From a first aspect, the present invention resides in a power distribution system comprising a first power distribution unit coupled to an electrical power source, the first distribution unit comprising at least one first solid state power controller configured to control current flow through the first distribution unit and control means configured to receive and analyse data related to measurements of downstream current and to interrupt the power within the first distribution unit when the received current measurements exceed a predetermined threshold, a second lower power distribution unit serially coupled to the first distribution unit and configured to supply to power to one or more loads, the second distribution unit comprising at least one second solid state power controller configured to control current flow through the second distribution unit and a current monitoring component configured to measure the current flow to, or within, the second distribution unit, the current monitoring component configured to transmit current data to the control means within the first distribution unit for analysis.

From a further aspect, the present invention resides in a method of back-up overcurrent protection in a power distribution system comprising, a first power distribution unit coupled to an electrical power source and a downstream second lower power distribution unit serially coupled to the first distribution unit and configured to supply to power to one or more loads, the method comprising measuring the current flow to, or within, the second distribution unit, transmitting the current measurements to control means within the first distribution unit, analysing the current measurements in the control means and interrupting the power within the first distribution unit when the received current measurements exceed a predetermined threshold.

BRIEF DESCRIPTION OF DRAWINGS

Embodiments of the invention will now be described, by way of reference only, to the accompanying drawings in which.

DETAILED DESCRIPTION

It should further be understood that in the following described embodiments of the invention, use of terms such as "component", "unit or "element" are intended to denote a functional block, rather than any limitation in terms of physical packaging of devices.

Figure 4:
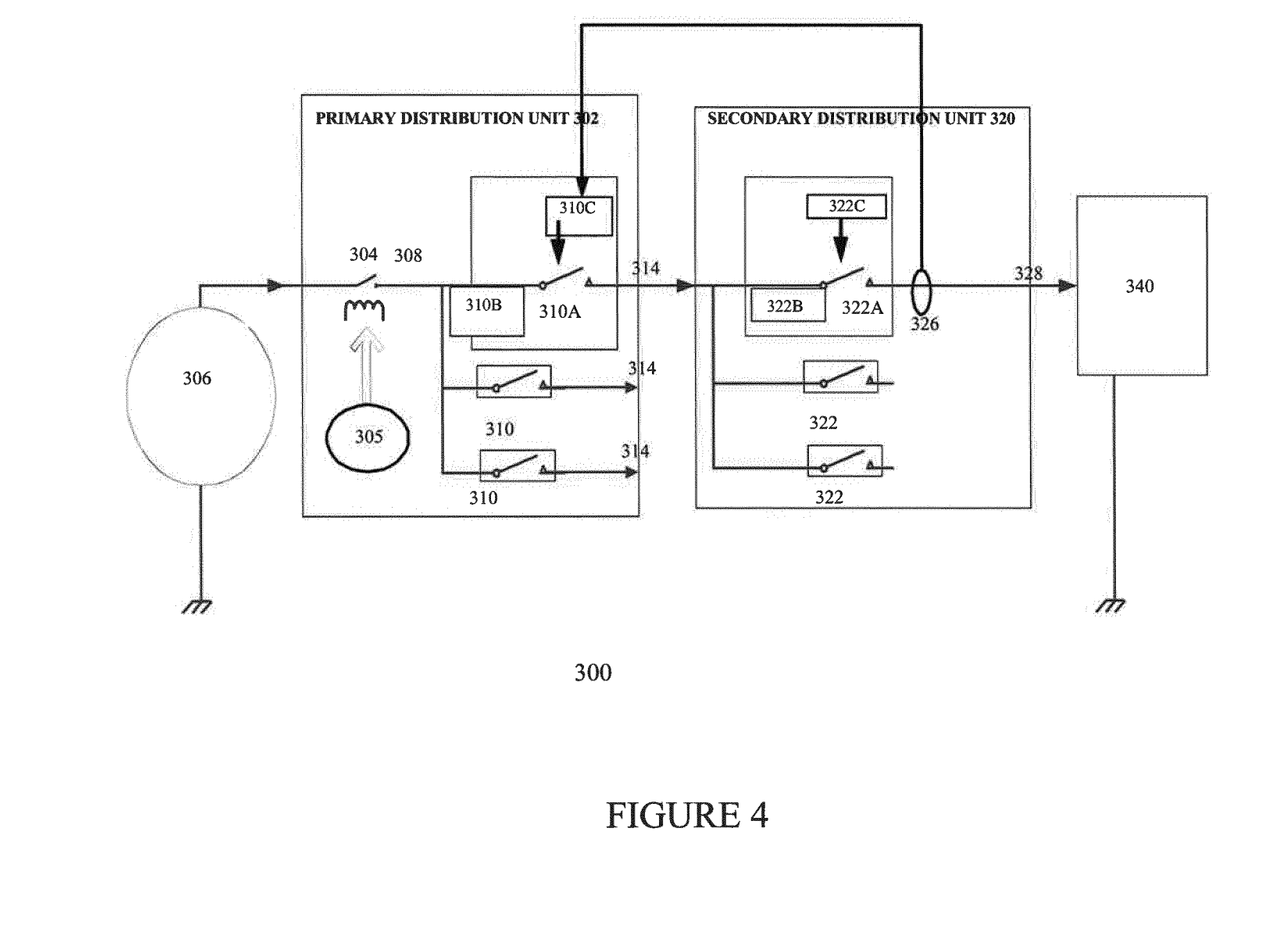
FIG. 4 is a block diagram representation of a power distribution system according to an embodiment of the present invention.

An embodiment of the present invention will now be described with reference to FIG. 4 which is a simplified representation of a power distribution system 300, using SSPCs in both the primary 302 and secondary distribution units 320. Although only one primary distribution unit 302 and one secondary distribution unit 320 are shown, it should be understood that the system may comprise a plurality of primary and secondary distribution units. The power input into the primary distribution unit 302 is controlled by a primary power source contactor 304 and its associated control logic 305 which connects electric power from a power source 306, such as a generator, to the primary distribution unit's internal bus 308. Power distribution to each secondary distribution unit 320 is controlled by a series of individual primary SSPCs 310 which are coupled to the internal bus 308. Again, although three primary SSPCs 310 are shown in FIG. 4, with the configuration of just one of these being shown in detail, it should be understood that any number of similar primary SSPCs 310 may be used within a particular primary distribution unit 302 depending on the overall system requirements and the arrangement of distribution circuitry within that unit 302. As will be described in more detail below, the control logic 310C of the primary SSPC 310 comprises enhanced functionality as compared to that of the primary SSPC 210 of FIG. 3.

In the secondary distribution unit 320, distribution of power from the primary distribution output bus to a load 340 is controlled via a SSPC 322. It should be understood that the further two SSPCs 322 shown in FIG. 4, would normally be connected to further loads (not shown) in a similar manner to that of the first SSPC 322. Again, each secondary SSPC 322 comprises a switching element 322A, a current monitoring component 322B and control logic 322C. The current monitoring component 322B typically measures the current flowing through SSPC 322 from the input current received from the primary distribution unit 302, with the control logic 322C being programmed to cause the switching element 322A to trip on detection of an overcurrent condition. The backup fuse of the systems described with reference to FIGS. 2 and 3 has now been replaced by an additional current monitoring component 326 provided in series downstream of the secondary SSPC 322. The current monitoring component 326 is configured to continuously measure the current flow through the secondary distribution load wiring 328 and to transmit the measured current value to the control logic 310C of the primary SSPC 310 in the primary distribution unit 302. It should be understood that the term "continuously" above, is used in the context of digital circuits where the rate of sampling of the current is such that data measurements will be transmitted to the control logic substantially in real time.

The connection between the current monitoring component 326 and the control logic 310C of the primary SSPC 310 may take any form, from a simple, direct-wired connection to a complex form involving many elements such as signal processing, digitizing and network data transfer. Indeed in an aircraft situation, the aircraft's own network may be used, provided the required standards of reliability and data integrity are satisfied. The choice of connection is immaterial to the present invention, providing it remains independent of any fault that the secondary SSPC 322, including its current monitoring component 332B may encounter.

The enhanced control logic 310C of the primary SSPC 310 is configured to analyse the current measurements transmitted from the current monitoring component 326, and in the event that the measured current exceeds the time-current trip characteristic of the secondary SSPC 322 by a predetermined amount, which indicates a fault with the secondary SSPC 322, the switching element 310A of the primary SSPC 310 will trip, thereby protecting the secondary distribution load wiring 328. Hence, an effective secondary protection mechanism for the secondary distribution unit 320 can be achieved with only a single simple discrete current monitoring component 326 and the enhanced functionality of the control logic 310C of the primary SSPC 310.

The present invention utilizes the inherent difference between the currents involved in the primary 302 and secondary 320 distribution units, in that the time-current trip characteristic of the primary SSPC 310 is typically of a significantly greater magnitude than the fault-free trip time-current trip for the SSPC 322 in the secondary distribution unit.

Since the primary SSPC 310 is involved in the backup protection mechanism of the secondary SSPC 322, it should be understood that the primary SSPC 310 and the secondary SSPC 322 should be sufficiently dissimilar in design to effectively prevent the risk of failure of both SSPCs due to a common design issue. It is assumed that the probability of the primary SSPC 310 tripping is extremely rare, since it implies a double fault (i.e., a fault of the load 340 or wiring 328 demanding excessive current, as well as failure of secondary SSPC 322 to isolate the individual circuit). Furthermore, it assumes that the overall system design is such that primary SSPC 310 may trip without an unacceptable consequence. For example, in an aircraft, the aircraft would be designed to be able to continue to fly and land safely even in the event of primary SSPC 310 tripped.

It should be understood that although the additional current monitoring component 326 shown in FIG. 4 is located downstream of SSPC 322, current monitoring may take place at other appropriate points within the system. The invention is based upon monitoring the secondary current to enable a switching element further upstream to protect a circuit, in the event that the SSPC directly responsible fails to perform its protective function. Therefore, for example, the current monitoring point could be moved to a position upstream of secondary SSPC 322, or could take the form of an independent unit, just outside of the secondary distribution unit 320.

The configuration of particular embodiment of the present invention described above with reference to FIG. 4 will ensure complete independence from any fault in the secondary SSPC 322, including its current monitoring component 322B, by having an independent current monitoring component 326 and the separate control logic 310C of the primary SSPC 310. However, it is known that the most common reason for failure of an SSPC will involve failure of the switching element to open, rather than problems relating to the current monitoring component associated therewith. Hence, it is envisaged that in other embodiments of the invention, rather than a discrete additional current monitoring component, the internal current monitoring component 322B of the secondary SSPC 322, or some processed value or decision based on the measurements made by the secondary SSPC current monitoring component 322B, could be used to derive the decision for the primary SSPC 310 to open. Alternatively, in still a further embodiment of the present invention, a hybrid approach may be used, wherein the functionality of the current monitoring component 322B of the secondary SSPC 322 and that of the additional current monitoring component 326 is realized by a single current monitoring component. In all of these alternative embodiments, the particular configuration might be justified if the monitoring technology used is intrinsically very reliable, or in some less critical applications where the residual risk associated with failures due to the current monitoring technology is deemed acceptable.

The invention essentially delegates the responsibility of protecting against failure of the secondary SSPC 322 to the primary SSPC 310 which minimises loss of power distribution within the system. In other words, tripping of the switching element 310A of a primary SSPC 310 will only result in power being cut to any secondary SSPCs downstream from it, but will not affect the whole distribution system. In applications such as aircraft, it is better and safer, to remove power from as few subsystems as is possible and consistent with preventing overcurrent damage, including fires etc. However, since commercial aircraft will typically have at least two semi-independent power distribution subsystems, it will generally be safe to completely depower one subsystem, at least for the duration of a single flight.

Although in the embodiments described above, analysis of the transmitted current measurement is performed by the enhanced control logic 310C of the primary SSPC 310, it should be understood that the analysis may be undertaken by any appropriate device in the power distribution system 300, upstream of the secondary SSPC 322. For example, although the primary power source contactor 304 which controls the flow of electricity from the power source 306 to the primary distribution unit 302 was traditionally realized by electromagnetic relays, solid-state equivalents with associated control logic are now becoming more prevalent, In alternative embodiments of the present invention, the current monitoring component 326 or 322B may instead transmit the current measurements to control logic 305 associated with the primary power source contactor 304, which may be also be realized with enhanced functionality, to perform the analysis of the transmitted current measurement data.

On detection of the measured current exceeding the time-current trip characteristic of the secondary SSPC 322 by a predetermined amount, which indicates a fault with the secondary SSPC 322, the control logic 305 associated with the primary power source contactor 304 is configured to cause the complete disconnection of the power source 306 in order to protect the secondary distribution load wiring 328. However, it should be understood that this approach will result in the removal of power from all loads within the system which may not be acceptable in some applications. The particular choice of component in which the analysis functionality is to be realized will vary in different situations, depending on the overall system configuration, the probability of faults and the associated consequences, together with the costs, weight and other factors associated with the provision of redundant systems to take over in the event of a fault.

It should however, be understood that in this embodiment the invention may also be applied to a traditional electromechanical contactor, typically controlled by a coil driver, by appropriate adaptation to the coil driver to perform the analysis of the transmitted current measurement data.

Figure 5:
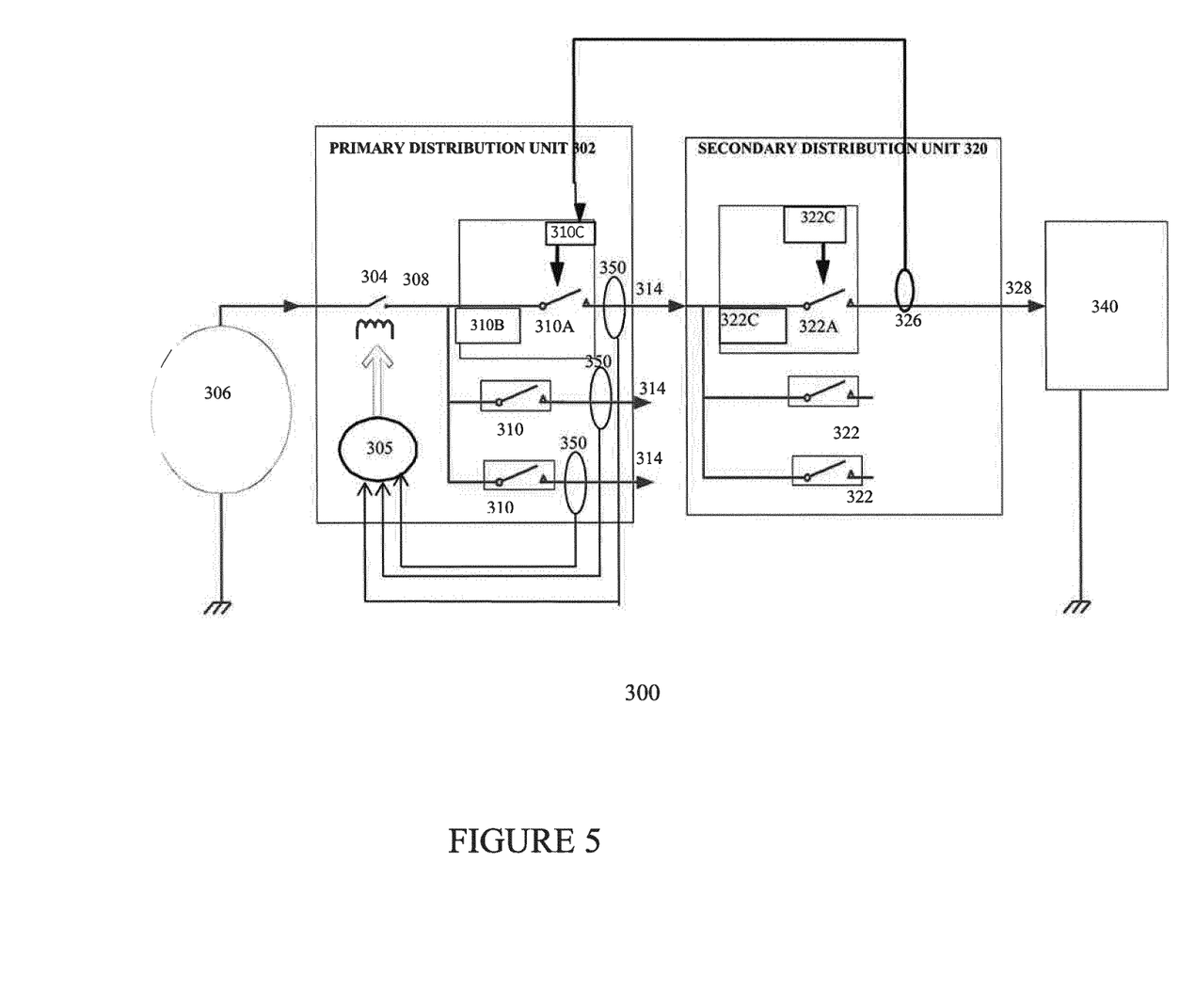
FIG. 5 is a block diagram representation of a power distribution system according to another embodiment of the present invention.

The cable 314 between the primary distribution unit 302 and the secondary distribution unit 320 does not have secondary protection in the event that the primary SSPC 310 fails. It should be understood that the underlying principle of the present invention could be applied to address this issue, by employing the primary power source contactor 304, or the power source 306 to provide independent means of breaking the power to the distribution system 300. This embodiment of the invention is illustrated in FIG. 5 of the drawings, which is largely identical to FIG. 4, except that an additional current monitoring component 350 is provided upstream of the secondary SSPC 310 within or just outside of the primary distribution unit 302 and is configured to measure the current flowing through the cable 314 connecting the primary and secondary distribution units 302 and 320. This additional current monitoring device 350 is configured to transmit the current measurements to the control logic 305 associated with the primary power source contactor 304, which is realized with enhanced functionality, to perform the analysis of the transmitted current measurement data. On detection of the measured current exceeding the time-current trip characteristic of the primary SSPC 310 by a predetermined amount, which would indicate a fault with the primary SSPC 310, the controller 305 associated with the primary power source contactor 304 is configured to cause the complete disconnection of the power source 306 in order to protect the circuitry of secondary distribution unit 320 and the cable 314. In an alternative embodiment of the invention, control logic (not shown) associated with the power source (306) may be used to perform the analysis of the transmitted current measurement data and to cause disconnection of the power source (306). Again, in both of these embodiments, this approach will result in the removal of power from all primary SSPCs 310 and their downstream loads.

Although the term SSPC implies that the switching element is accomplished by solid state components such as MOSFETs, it should be understood that a hybrid type SSPC, typically consisting of solid state control logic which in turn commands a relay, contactor, or similar electro-mechanical device, to switch the main current flow may be used in any embodiment of the present invention.

Whilst the invention is principally aimed at providing backup overcurrent protection, it is envisaged that the concept can be simply extended to provide a secondary isolation function in event of any other detectable failure of an SSPC which would prevent the SSPC opening the circuit when required. For example, in high integrity applications like aviation, the SSPCs, and any associated controllers etc., will incorporate built-in testing (BIT) capabilities. In the event that a fault is detected during self-testing of a secondary SSPC 322, which implies that the overcurrent system is compromised or that another essential capability, such as the ability to switch the power flow on and off when commanded, has failed, it might be advisable to remove power from the affected part of the system. In such a situation, the results of the self-testing could be transmitted to the control logic 310C of the primary SSPC 310 for analysis and the primary SSPC 310 may be configured to trip, thereby protecting the secondary distribution load wiring 328.

It should be appreciated that although the described embodiments, as illustrated in the FIGS. 4 and 5 comprise two levels of distribution (Primary and Secondary), the system may be readily scaled up to include further units (Tertiary etc.) in a similar manner to the first two. As described above, the invention is based upon monitoring current to enable a switching element further upstream to protect a circuit, in the event that the SSPC directly responsible fails to perform its protective function. Hence, the principles of the present invention may be applied across any pair of distribution units in a serial chain, (e.g. Primary and Tertiary) to provide corresponding protection, as will be evident to the skilled person. As stated above, although the term "unit" as used throughout this application, matches the physical packaging commonly found in electrical power distribution systems, it should be appreciated that the teaching of the invention is independent of the allocation of functional blocks to physical packaging.

It should also be understood that although the present invention has been mainly described in the context of aircraft applications, typically using a single conductor system with the conductive chassis of the aircraft providing current return, the invention may also be realized in other applications, where the current return comprises conductive wiring.

It should also be understood that the present invention may be readily scaled for complex conductor schemes such as multi-rail DC or poly-phase alternating current using standard engineering techniques. For a number of practical reasons including safety, such scaled systems would normally coordinate the overload tripping mechanism to ensure that all related rails or phases to the faulty load are disconnected when a fault situation on one more rails or phases is detected. In this respect, it should be appreciated that the present invention is superior to the conventional fuse approach which can only disconnect rails or phases that are actually passing excessive current.

The present invention capitalizes and supports contemporary technical trends, particularly the increasing use of SSPC style technology in higher current positions, such as those found in the primary distribution units, with minimal additional circuitry and complexity required for implementation. The configuration of the present invention may be implemented at minimal extra cost and eliminates the compromises associated with the use of fusible elements.

In an embodiment, since detection of a fault condition of the secondary SSPC 322 results only in a change of state of the switching device of the primary SSPC 310, such changes may be potentially reversed, either manually or automatically, without physical component replacement, if it can be established that the cause of the uncontrolled current overload is no longer valid. This presents a considerable cost advantage in comparison to replacement of damaged fuse devices. In certain cases in aircraft applications, such as for example, when the electrical load contributes to the continued safe flight and landing operations of an aircraft, it may reduce the probability of a major safety incident.

While the invention has been described in the context of what is presently considered to be the most practical and preferred embodiments, it is to be understood that the invention is not to be limited to the disclosed embodiments, and that variations can be used without departing from the basic teachings herein.

The invention claimed is:

1. A power distribution system comprising:
a first power distribution unit coupled to an electrical power source, the first power distribution unit comprising at least one first solid state power controller configured to control current flow through the first power distribution unit and a controller configured to receive and analyze data related to measurements of downstream current and to interrupt the power within the first power distribution unit when the received current measurements exceed a predetermined threshold;
a second power distribution unit serially coupled to the first power distribution unit and configured to supply to power to one or more loads, the second power distribution unit comprising at least one second solid state power controller configured to control current flow through the second power distribution unit;
a current monitoring component configured to measure the current flow to, or within, the second power distribution unit, the current monitoring component configured to transmit current data to the controller within the first power distribution unit for analysis; and
wherein the first power distribution unit has a time-current trip characteristic that is greater than a time-current trip characteristic of the second power distribution unit.

2. The power distribution system of claim 1, wherein the current monitoring component is a discrete component located in line with the at least one second SSPC and is configured to measure the current flow through load wiring of the second power distribution unit.

3. The power distribution system of claim 1, further comprising a power cable connecting the first and second power distribution units, wherein the current monitoring component comprises a discrete component located upstream of the power cable and configured to measure the current flow through the power cable.

4. The power distribution system of claim 3, further comprising a power source contactor configured to couple an electric power source to an internal bus of the first power distribution unit, wherein the controller is associated with the power source contactor and is configured to disconnect the power source contactor when the received current measurements exceed the time-current trip characteristic of the first power distribution unit.

5. The power distribution system of claim 1, wherein the controller comprises control logic integral with the at least one first SSPC and is configured to cause a switching element of the at least one first SSPC to trip when the received current measurements exceed the time-current trip characteristic of the second SSPC by a predetermined amount.

6. The power distribution system of claim 1, wherein the current monitoring component is integral with the second SSPC and is configured to measure the current flow through the second SSPC.

7. The power distribution system of claim 6, wherein the current monitoring component comprises a built-in testing component of the system.

8. The power distribution system of claim 1, further comprising a power source contactor configured to couple an electric power source of an internal bus of the first power distribution unit, wherein the controller is associated with the power source contactor and is configured to disconnect the power source contactor when the received current measurements exceed the time-current trip characteristic of the second power distribution unit by a predetermined amount.

9. The power distribution system of claim 1, wherein a tripping of the first power distribution unit requires a double fault.

10. The power distribution system of claim 9, wherein the double fault includes: (i) a first fault at one of a load and a wiring and (ii) a second fault at the second power distribution unit.

11. A method of back-up overcurrent protection in a power distribution system, the method comprising:
  providing a first power distribution unit coupled to an electrical power source and a downstream second power distribution unit serially coupled to the first power distribution unit and configured to supply to power to one or more loads, the first power distribution unit has a time-current trip characteristic that is greater than a time-current trip characteristic of the second power distribution unit;
  measuring the current flow to, or within, the second power distribution unit;
  transmitting the current measurements to a controller associated with the first power distribution unit;
  analyzing the current measurements in the controller; and
  interrupting the power within the first power distribution unit when the received current measurements exceed a predetermined threshold.

12. The method of claim 11, wherein measuring the current flow comprises measuring the current flow through load wiring of the second power distribution unit.

13. The method of claim 11, wherein measuring the current flow comprises measuring the current flow through a second SSPC of the second power distribution unit.

14. The method of claim 13, wherein measuring the current flow comprises measuring the current flow through the second SSPC and transmitting the current measurements to the control logic during built-in testing of the system.

15. The method of claim 11, wherein transmitting the current measurements comprises transmitting the current measurements to control logic of a first SSPC associated with the first power distribution unit, wherein a switching element of the first SSPC is configured to trip when the received current measurements exceed a time-current trip characteristic of a second SSPC associated with the second power distribution unit by a predetermined amount.

16. The method of claim 11, wherein interrupting the power within the first power distribution unit comprises disconnecting a power source contactor within the first power distribution unit when the received current measurements exceed the time-current trip characteristic of a second SSPC associated with the second power distribution unit by a predetermined amount.

17. The method of claim 11, wherein measuring the current flow comprises measuring the current flow through a power cable connecting the first and second power distribution units and disconnecting a power source contactor within the first power distribution unit when the received current measurements exceed the time-current trip characteristic of a first SSPC associated with the first power distribution unit by a predetermined amount.

18. The method of claim 11, wherein the providing further includes the first power distribution being configured to trip as a result of a double fault.

19. The method of claim 18, wherein the double fault includes: (i) a first fault at one of a load and a wiring and (ii) a second fault at the second power distribution unit.

* * * * *